(12) United States Patent
Fujioka

(10) Patent No.: US 11,505,102 B2
(45) Date of Patent: Nov. 22, 2022

(54) VEHICLE SEAT, AND HEADREST SUPPORT DEVICE FOR VEHICLE SEAT

(71) Applicants: TOYOTA JIDOSHA KABUSHIKI KAISHA, Toyota (JP); SUBARU CORPORATION, Tokyo (JP)

(72) Inventor: Atsuji Fujioka, Shibuya-ku (JP)

(73) Assignees: Toyota Jidosha Kabushiki Kaisha, Toyota (JP); Subaru Corporation, Tokyo (JP)

(*) Notice: Subject to any disclaimer, the term of this patent is extended or adjusted under 35 U.S.C. 154(b) by 0 days.

(21) Appl. No.: 17/354,479

(22) Filed: Jun. 22, 2021

(65) Prior Publication Data
US 2022/0041086 A1 Feb. 10, 2022

(30) Foreign Application Priority Data
Aug. 7, 2020 (JP) .............................. JP2020-134977

(51) Int. Cl.
*B60N 2/888* (2018.01)
*B60N 2/865* (2018.01)
*B60N 2/42* (2006.01)

(52) U.S. Cl.
CPC ........... *B60N 2/888* (2018.02); *B60N 2/4228* (2013.01); *B60N 2/865* (2018.02)

(58) Field of Classification Search
CPC ...... B60N 2/888; B60N 2/865; B60N 2/4228; B60N 2/42754; B60N 2/42745; B60N 2/42781; B60N 2/838
See application file for complete search history.

(56) References Cited

U.S. PATENT DOCUMENTS

| 5,378,043 A * | 1/1995 | Viano ..................... | B60N 2/888 297/216.12 |
| 6,199,947 B1 * | 3/2001 | Wiklund ................ | B60N 2/865 297/216.12 |
| 6,375,262 B1 * | 4/2002 | Watanabe .............. | B60N 2/838 297/216.12 |
| 6,523,892 B1 * | 2/2003 | Kage ...................... | B60N 2/888 297/216.13 |
| 6,631,955 B2 * | 10/2003 | Humer ................... | B60N 2/838 297/216.12 |
| 6,749,256 B1 * | 6/2004 | Klier ...................... | B60N 2/853 297/216.12 |

(Continued)

FOREIGN PATENT DOCUMENTS

JP 2012-011882 A 1/2012

*Primary Examiner* — David R Dunn
*Assistant Examiner* — Tania Abraham
(74) *Attorney, Agent, or Firm* — Finnegan, Henderson, Farabow, Garrett & Dunner, LLP

(57) ABSTRACT

A vehicle seat includes a seat back frame. The vehicle seat includes a suspension mat disposed within the seat back frame. The vehicle seat includes a linking member that elastically supports the suspension mat at the seat back frame. The vehicle seat includes a bushing that is disposed at an upper portion of the seat back frame. The vehicle seat includes a hollow stay inserted into the bushing, the stay protruding upward from the upper portion of the seat back frame. The vehicle seat includes a headrest fixed at an upper end of the stay. An upper end of the linking member is inserted into the stay from a lower end of the stay that is inserted into the bushing.

8 Claims, 6 Drawing Sheets

(56) References Cited

U.S. PATENT DOCUMENTS

| | | | | |
|---|---|---|---|---|
| 6,871,913 B2* | 3/2005 | Malsch | .................. | B60N 2/888 297/216.12 |
| 7,044,544 B2* | 5/2006 | Humer | ................. | B60N 2/4228 297/216.12 |
| 8,690,238 B2* | 4/2014 | Orzelski | ................ | B60N 2/888 297/216.12 |
| 2010/0013275 A1* | 1/2010 | Yokota | .................. | B60N 2/888 297/61 |
| 2010/0187874 A1* | 7/2010 | Matsui | ............... | B60N 2/42781 297/216.12 |
| 2014/0354025 A1* | 12/2014 | Ishimoto | ................ | B60N 2/888 297/408 |

* cited by examiner

VEHICLE SEAT, AND HEADREST SUPPORT DEVICE FOR VEHICLE SEAT

CROSS-REFERENCE TO RELATED APPLICATION

This application claims priority to Japanese Patent Application No. 2020-134977 filed on Aug. 7, 2020, incorporated herein by reference in its entirety.

BACKGROUND

1. Technical Field

The technology disclosed in the present disclosure relates to a vehicle seat and a headrest support device for a vehicle seat.

2. Description of Related Art

A configuration of a vehicle seat is known in which a headrest is moved forward in the vehicle front-rear direction at the time of a rear-end collision of the vehicle, thereby supporting the head of an occupant. Japanese Unexamined Patent Application Publication No. 2012-11882 (JP 2012-11882 A) discloses a vehicle seat provided with a movable mechanism that moves a headrest in the front-rear direction, and a motor that drives the movable mechanism.

SUMMARY

The seat in JP 2012-11882 A requires many parts, such as the motor, the movable mechanism, various types of sensors, and so forth, and the configuration is complicated. This may lead to increased costs and increased weight.

The present disclosure provides a vehicle seat in which a headrest can be moved forward in a vehicle front-rear direction at the time of a rear-end collision of a vehicle by a simple configuration.

A vehicle seat according to an aspect of the disclosure includes a seat back frame. The vehicle seat includes a suspension mat disposed within the seat back frame. The vehicle seat includes a linking member configured to elastically support the suspension mat at the seat back frame. The vehicle seat includes a bushing configured to be disposed at an upper portion of the seat back frame. The vehicle seat includes a hollow stay inserted into the bushing, the stay being configured to protrude upward from the upper portion of the seat back frame. The vehicle seat includes a headrest fixed at an upper end of the stay. An upper end of the linking member is inserted into the stay from a lower end of the stay that is inserted into the bushing.

With the vehicle seat according to the above aspect, at the time of a rear-end collision of the vehicle, the body of the occupant moves rearward in the front-rear direction of the vehicle, and the body strongly sinks into the suspension mat. As the suspension mat moves rearward in the front-rear direction of the vehicle, the linking member also moves rearward in the front-rear direction of the vehicle, and thus the lower portion of the stay moves rearward in the front-rear direction of the vehicle. Accordingly, the upper portion of the stay moves forward in the front-rear direction of the vehicle. By a simple structure, the headrest can be moved forward in the front-rear direction of the vehicle at the time of a rear-end collision of the vehicle.

In the vehicle seat, a gap may be provided between an inner face of the bushing and an outer face of the stay in a front-rear direction of a vehicle. A spring member that biases the stay toward a rear side in the front-rear direction of the vehicle may be further provided at an upper-side region of the bushing. In the vehicle seat according to the above aspect, by providing the gap between the inner face of the bushing and the outer face of the stay in the vehicle front-rear direction, a movable range of the headrest in the vehicle front-rear direction is secured. Also, the headrest can be kept stationary by biasing the stay toward the rear side in the front-rear direction of the vehicle by the spring member. In other words, the headrest can be held at a predetermined position. Looseness can be restrained from occurring during normal use.

In the vehicle seat, the spring member may be a flat spring integrally formed with the bushing. A slit extending along an outline of the flat spring may be provided at the bushing. In the vehicle seat according to the above aspect, the spring member can be provided using part of the bushing. The number of parts can be reduced.

In the vehicle seat, the linking member may be provided with a first region inserted into the stay. The linking member may be provided with a second region connecting a lower end of the first region and the suspension mat. Flexural rigidity of the second region may be lower than flexural rigidity of the first region. In the vehicle seat according to the above aspect, a linking mechanism that transmits movement of the suspension mat to the stay may be constituted by the first region. In other words, the first region may transmit movement of the suspension mat to the stay. Cushioning properties can be imparted to the vehicle seat by elastically supporting the suspension mat at the seat back frame by the second region.

A second aspect of the disclosure relates to a headrest support device for a vehicle seat. The vehicle seat includes a suspension mat, a seat back frame, and a headrest. The headrest support device includes a linking member configured to elastically support the suspension mat at the seat back frame, a bushing configured to be disposed at an upper portion of the seat back frame, and a hollow stay inserted into the bushing, the stay being configured to protrude upward from the upper portion of the seat back frame, and configured with the headrest fixed at an upper end of the stay. An upper end of the linking member is inserted into the stay from a lower end of the stay that is inserted into the bushing.

Details and further improvements of the technology disclosed in the present disclosure will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of Seat 1

Figure 1:
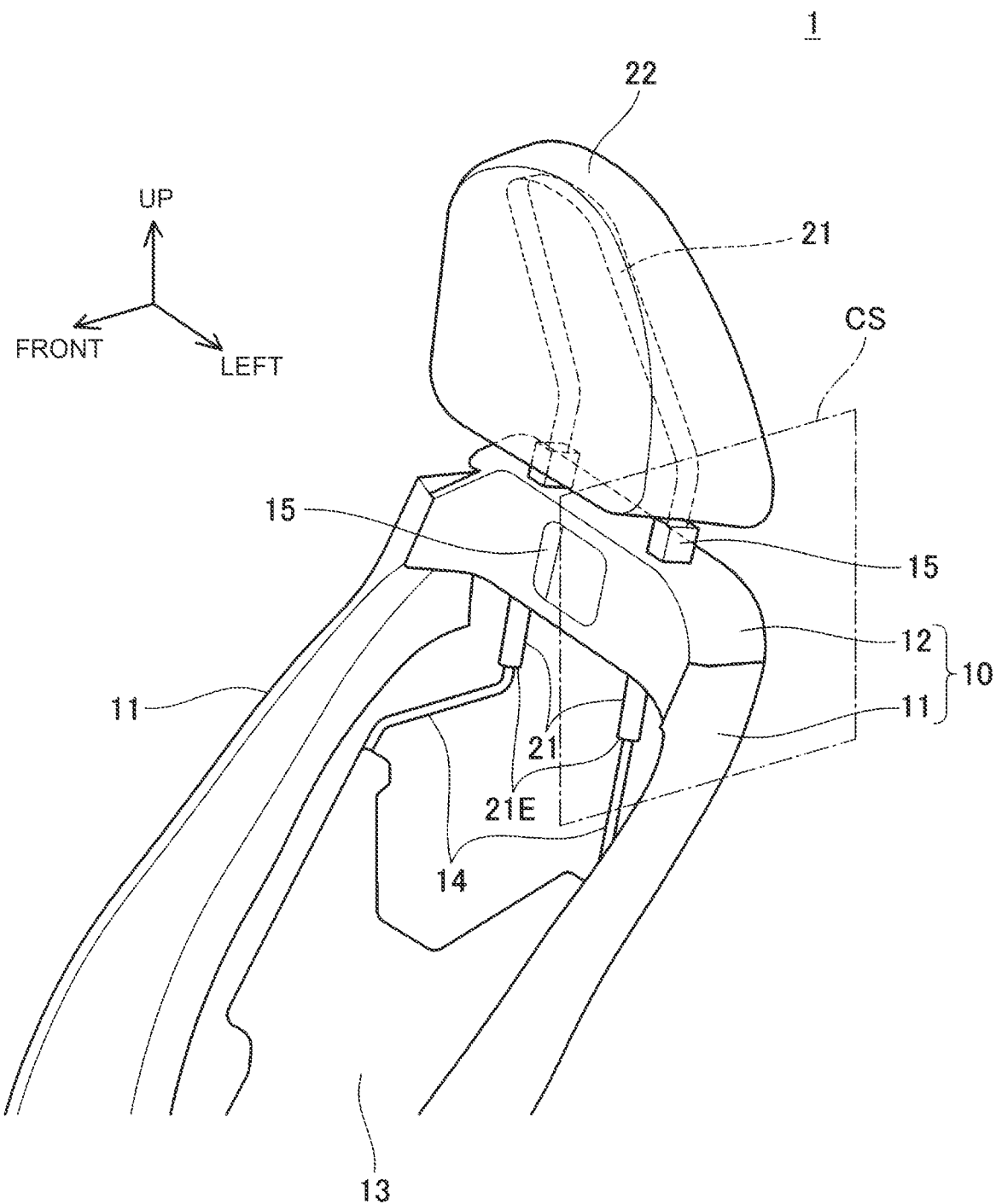
FIG. 1 is a perspective view of a seat 1.
Figure 2:
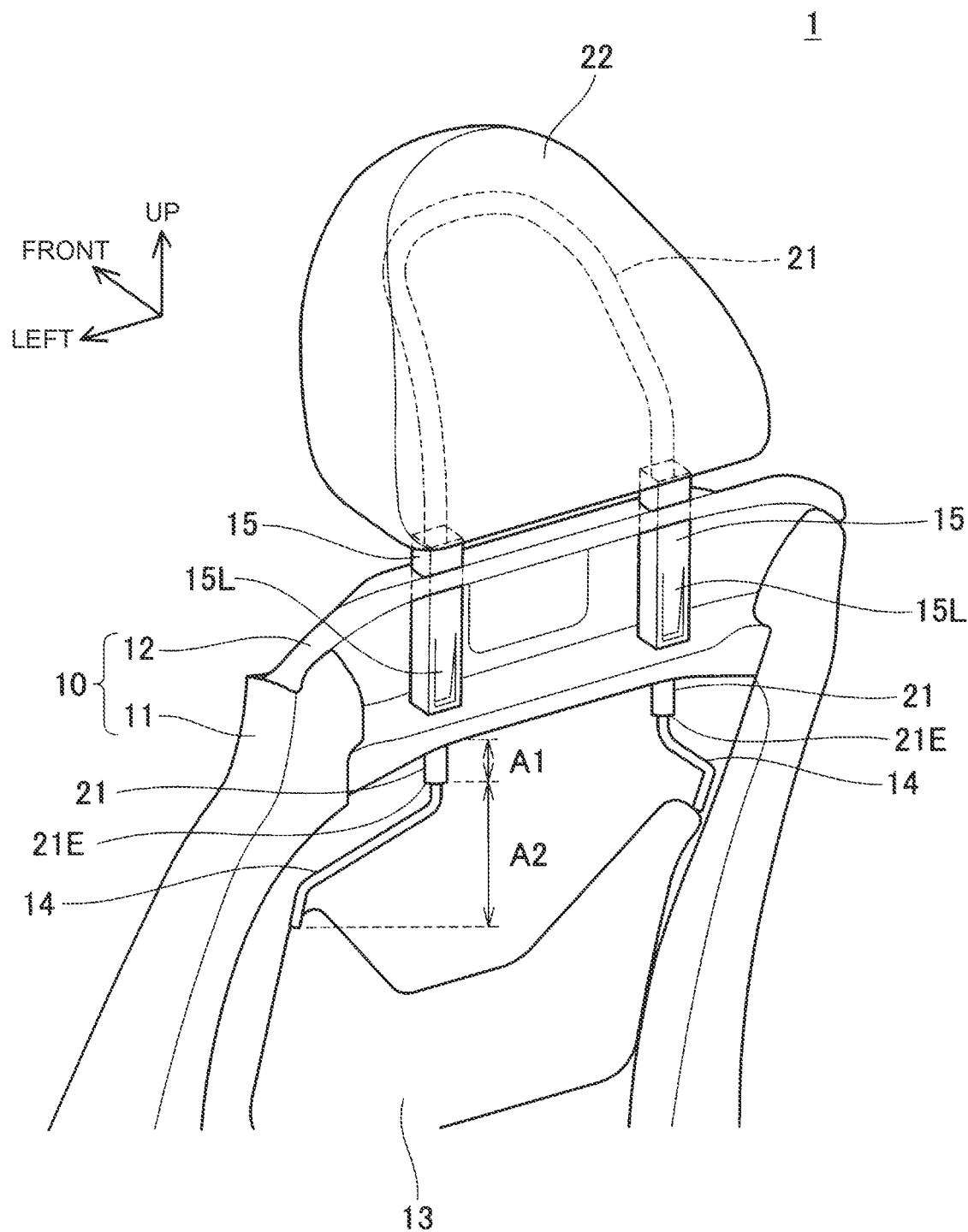
FIG. 2 is a perspective view of the seat 1.
Figure 3:
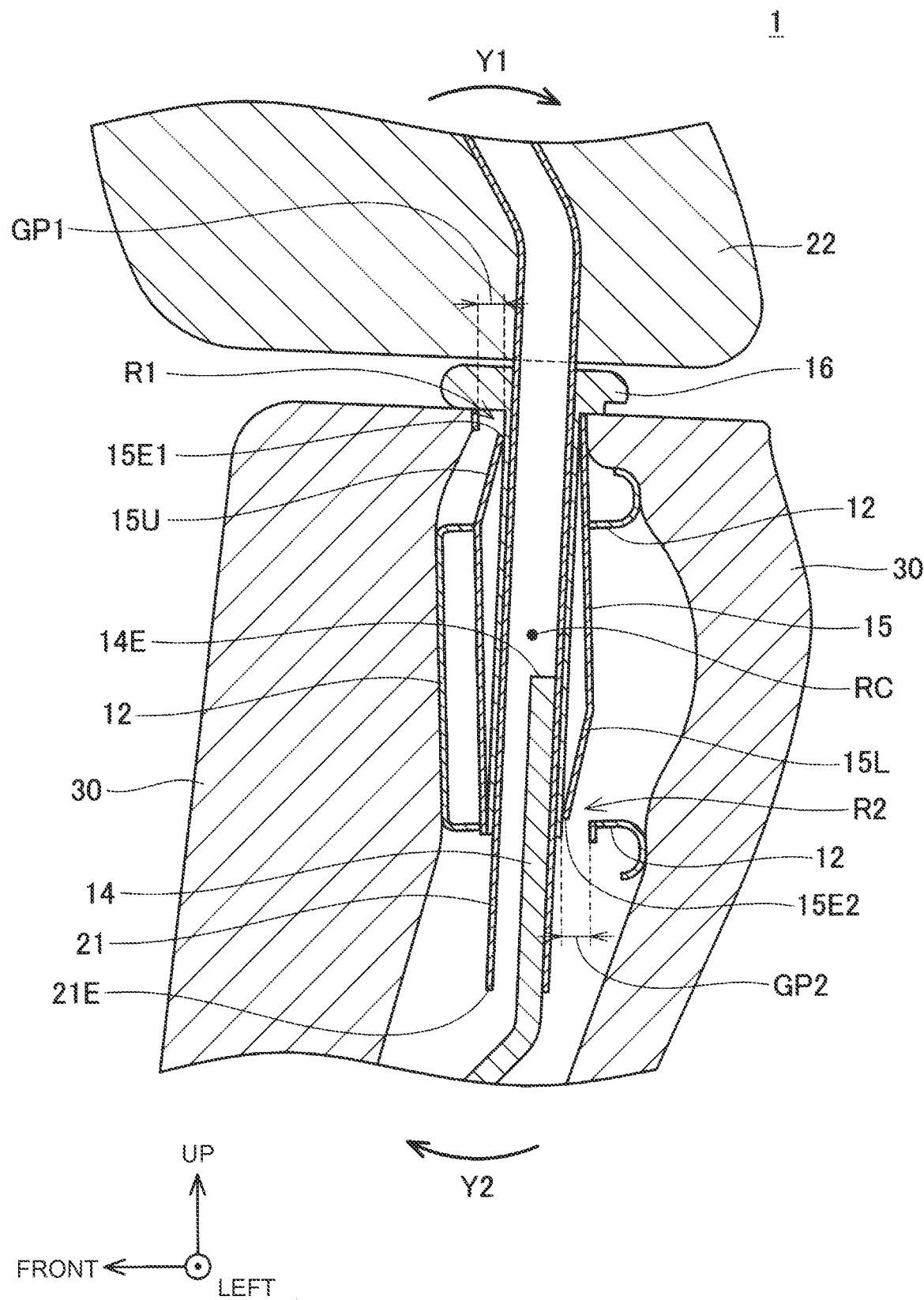
FIG. 3 is a cross-sectional view describing operations in a normal seated state.

FIG. 1 is a perspective view of a seat 1 from a forward position at an angle. FIG. 2 is a perspective view of the seat 1 from a rearward position at an angle. Upholstery structures of cushions and so forth are omitted from illustration in FIGS. 1 and 2, to facilitate understanding of inner structures, such as a seat frame 10 and so forth. In FIGS. 1 and 2, "Front" in the coordinates system indicates the forward direction in the vehicle front-rear direction, "Up" in the coordinates system indicates the upward direction in the vehicle up-down direction, and "Left" in the coordinates system indicates the left-side direction in the vehicle width direction. The same is true in the subsequent drawings as well. FIG. 3 is a cross-sectional view taken along cross-section CS in FIG. 1. The cross-section CS is a plane that passes through a center axis of a stay 21 inserted into a metal bushing 15, and that is perpendicular to the Left axis. FIG. 3 illustrates a normal seated state.

The seat 1 is provided with the seat frame 10, a suspension mat 13, linking members 14, the metal bushings 15, resin bushings 16, the stay 21, and a headrest 22. The seat frame 10 is a member serving as a frame for a seat back. The seat frame 10 is provided with side frames 11 and an upper cross-frame 12. The side frames 11 are right and left frames. The upper cross-frame 12 is frame that connects the upper end portions of the side frames 11 to each other.

A pair of metal bushings 15 is provided at the upper cross-frame 12. One of the pair of metal bushings 15 is provided at a right position, and the other of the pair of metal bushings 15 is provided at a left position. The metal bushings 15 are metal tubular members that have a rectangular cross-section. The resin bushings 16 are inserted into the metal bushings 15, as illustrated in FIG. 3. The resin bushings 16 are members for smoothing sliding of the stay 21 within the metal bushings 15, and fixing the position of the stay 21 in the up-down direction.

The stay 21 is inserted into the resin bushings 16. In other words, the stay 21 is inserted into the metal bushings 15 through the resin bushings 16. The stay 21 is a hollow pipe that has a circular cross-section. The stay 21 protrudes towards the upper side of the vehicle from the upper cross-frame 12. The headrest 22 is fixed to the upper end of the stay 21. The headrest 22 and the stay 21 make up an integral part in the present embodiment.

The inner faces of the resin bushings 16 are in contact with the outer face of the stay 21 without any gap therebetween. On the other hand, gaps are provided between the inner faces of the metal bushings 15 and the outer faces of the resin bushings 16. That is to say, gaps are provided between the inner faces of the metal bushings 15 and the outer face of the stay 21 in the vehicle front-rear direction, by way of the resin bushings 16. Providing the gaps between the inner faces of the metal bushings 15 and the outer face of the stay 21 in the vehicle front-rear direction enables a movable range of the headrest 22 in the vehicle front-rear direction to be secured.

Figure 4:
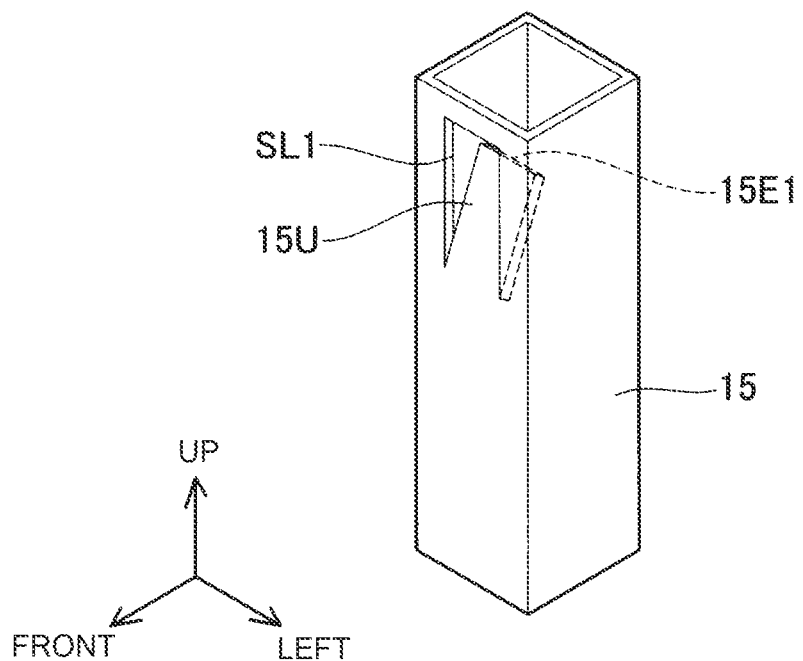
FIG. 4 is an enlarged perspective view of a metal bushing 15.
Figure 5:
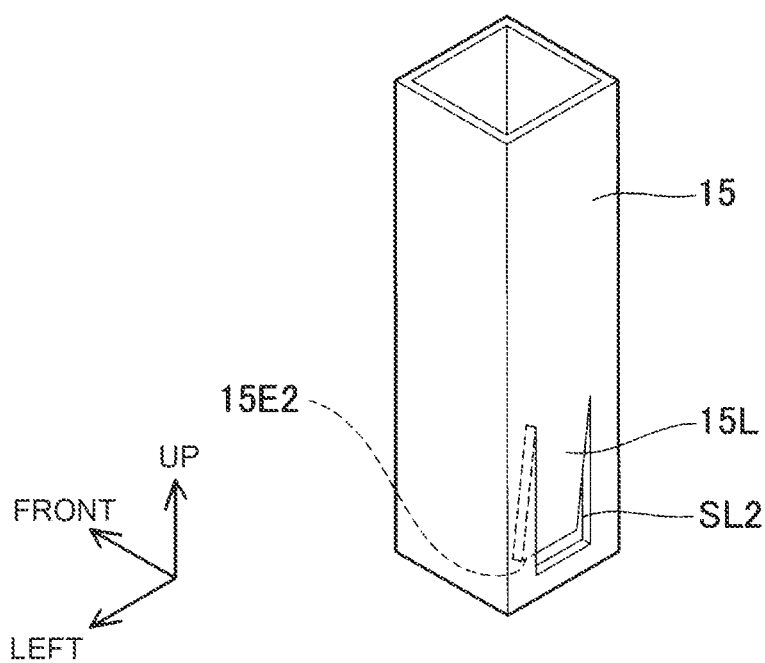
FIG. 5 is an enlarged perspective view of the metal bushing 15.

FIGS. 4 and 5 are enlarged perspective views of one of the metal bushings 15. FIG. 4 is a view from a forward position at an angle, and FIG. 5 is a view from a rearward position at an angle. As illustrated in FIG. 4, a leaf spring 15U is provided at the upper portion of the front side of the metal bushing 15 in the vehicle front-rear direction. Flat springs other than leaf spring 15U may also be used. Specifically, a slit SL1 extending along the outline of the leaf spring 15U is formed at the metal bushing 15. A free end 15E1 formed by the slit SL1 is bent so as to be located within the metal bushing 15 and to be inclined toward the rear side in the vehicle front-rear direction. Also, as illustrated in FIG. 5, a leaf spring 15L is provided at the lower portion of the rear side of the metal bushing 15 in the vehicle front-rear direction. Specifically, a free end 15E2 formed by a slit SL2 is bent so as to be inclined toward the front side in the vehicle front-rear direction. Thus, the leaf springs 15U and 15L can be formed using part of the metal bushing 15. This enables reduction of the number of parts.

As illustrated in FIG. 3, the free end 15E1 of the leaf spring 15U is in contact with the outer face at the front side of the resin bushing 16 in the vehicle front-rear direction at an upper-side region of the metal bushing 15 (see region R1). That is to say, the leaf spring 15U biases the stay 21 toward the rear side in the vehicle front-rear direction. Accordingly, a gap GP1 is formed between the inner face of the metal bushing 15 and the outer face of the resin bushing 16 in the vehicle front-rear direction.

The free end 15E2 of the leaf spring 15L is in contact with the outer face at the rear side of the resin bushing 16 in the vehicle front-rear direction at the lower-side region of the metal bushing 15 (see region R2). That is to say, the leaf spring 15L biases the stay 21 toward the front side in the vehicle front-rear direction. Accordingly, a gap GP2 is formed between the inner face of the metal bushing 15 and the outer face of the resin bushing 16 in the vehicle front-rear direction.

As illustrated in FIGS. 1 and 2, the suspension mat 13 is disposed within the seat frame 10. The suspension mat 13 is a synthetic resin plate, for example. The linking members 14 are members for elastically supporting the suspension mat 13 at the seat frame 10. In the present embodiment, the linking members 14 are metal wires. Upper ends 14E of the linking members 14 are inserted into the stay 21 from lower ends 21E of the stay 21 inserted into the metal bushings 15, as illustrated in FIG. 3. Thus, the linking members 14 are linked to the upper cross-frame 12. The bushings, the linking members 14, and the stay 21 make up a headrest support device.

As illustrated in FIG. 2, each of the linking members 14 has a first region A1 and a second region A2. The first region A1 is a region that is inserted into the stay 21. The second region A2 is a region that connects the lower end of the first region A1 and the suspension mat 13. A linking mechanism that transmits movement of the suspension mat to the stay can be constituted by the first regions A1. In other words, the first region transmits movement of the suspension mat to the stay at the time of a rear-end collision. Cushioning properties can be imparted by elastically supporting the suspension mat at the seat back frame by the second regions A2.

The second region A2 may have a lower flexural rigidity than the first region A1. For example, the diameter of the linking member 14 may be smaller at the second region A2 than at the first region A1. Accordingly, cushioning properties can be further improved, while maintaining the functions of the linking mechanism.

Operations

Operations in a normal seated state will be described with reference to FIG. 3. When an occupant is seated on the seat 1, the suspension mat 13 moves rearward in the front-rear direction of the vehicle, under the body weight of the occupant. The force of moving rearward in the front-rear direction of the vehicle is transmitted to a lower portion of the stay 21 via the linking members 14. However, the input to the suspension mat 13 by the occupant in a normal seated state is small as compared to that at the time of a rear-end collision of the vehicle. Hence, the biasing forces of the leaf springs 15U and 15L prevail over the moving force that is transmitted to the stay 21. Accordingly, with a rotational center RC as a center, a state in which the part of the stay 21 above the rotational center RC is rotationally moved rearward in the front-rear direction of the vehicle (arrow Y1) and in which the part of the stay 21 below the rotational center RC is rotationally moved forward in the front-rear direction of the vehicle (arrow Y2) is maintained. Thus, in a normal seated state, the headrest 22 can be held toward the rear side in the front-rear direction of the vehicle. Looseness of the headrest 22 in the front-rear direction of the vehicle thus can be restrained.

Figure 6:
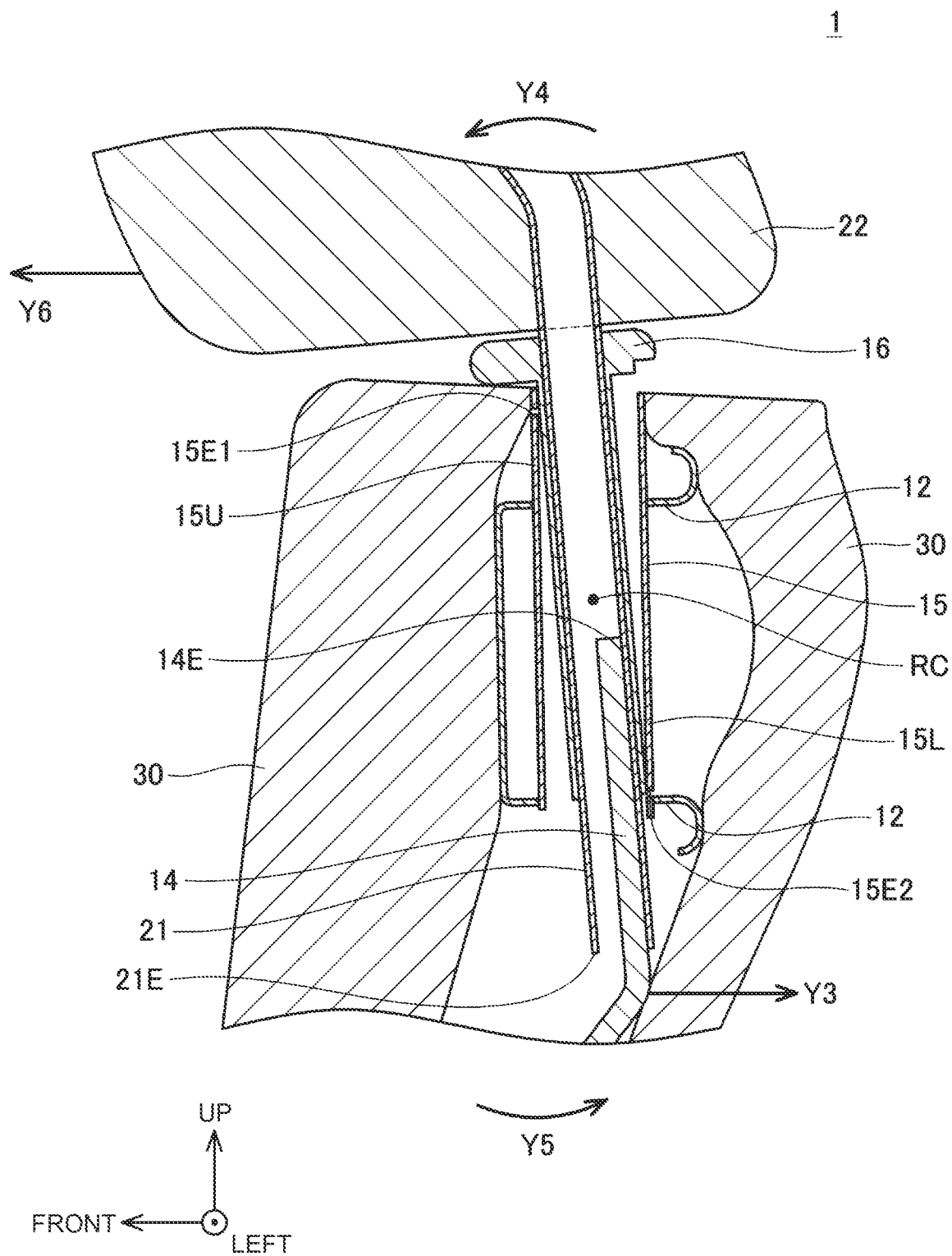
FIG. 6 is a sectional view describing operations at the time of a rear-end collision of a vehicle.

Operations at the time of a rear-end collision of the vehicle will be described with reference to FIG. 6. FIG. 6 is a cross-sectional view taken along the same cross-section as in FIG. 3. At the time of a rear-end collision of the vehicle, the body of the occupant moves rearward in the front-rear direction of the vehicle due to inertia force, and the body strongly sinks into the suspension mat 13. That is to say, input to the suspension mat 13 is great. The linking member 14 moves further rearward in the front-rear direction of the vehicle than in a normal seated state (arrow Y3). Accordingly, the moving force transmitted to the stay 21 exceeds the biasing force of the leaf springs 15U and 15L. As a result, with the rotational center RC as a center, the part of the stay 21 below the rotational center RC is rotationally moved rearward in the front-rear direction of the vehicle (arrow Y5) and the part of the stay 21 above the rotational center RC is rotationally moved forward in the front-rear direction of the vehicle (arrow Y4). The headrest 22 can be moved forward in the front-rear direction of the vehicle in accordance with the law of the lever (arrow Y6). Thus, by a simple structure, the head of the occupant can be protected at the time of a rear-end collision of the vehicle.

Advantages

Figure 7:
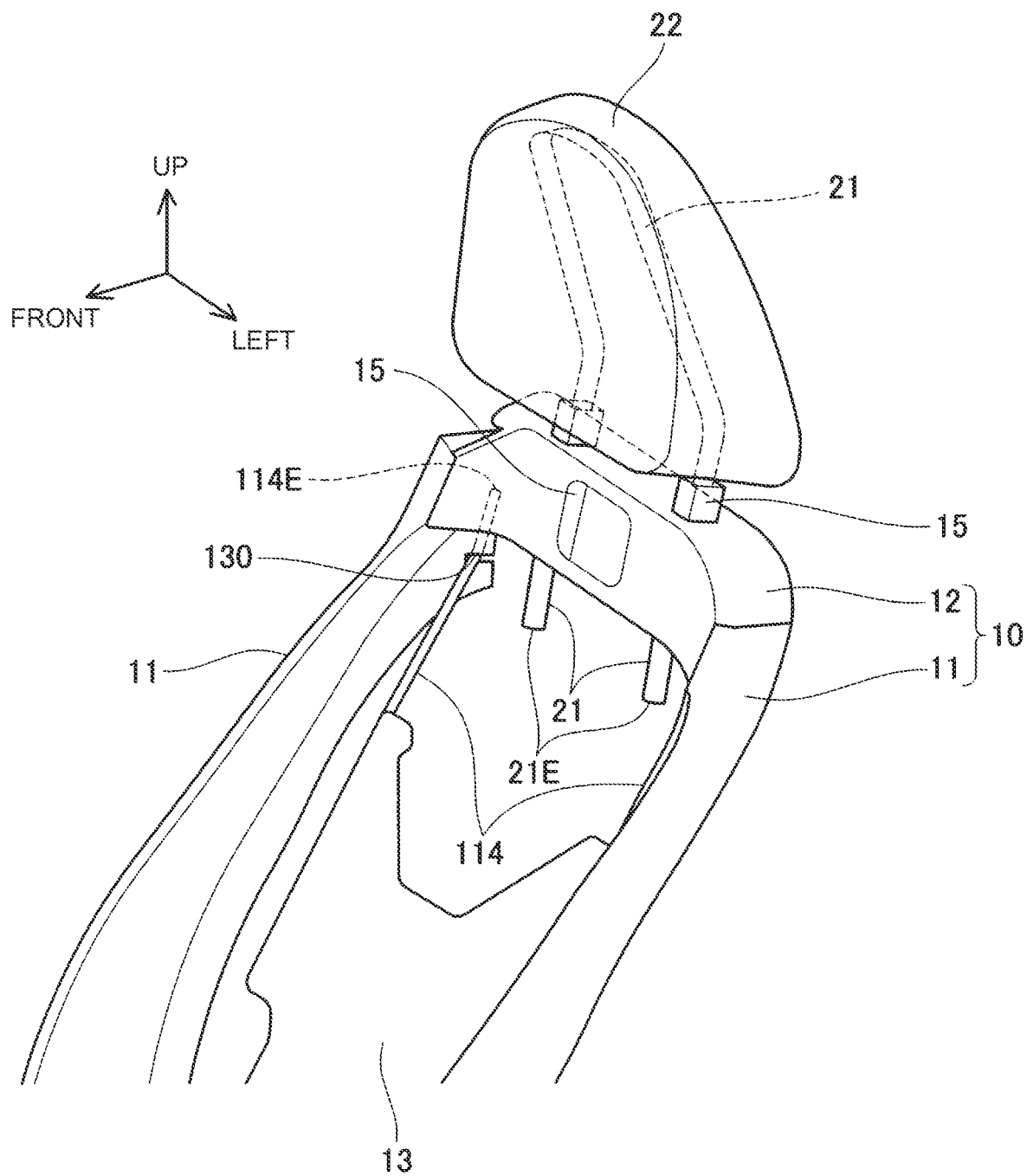
FIG. 7 is a perspective view of a seat 100 according to related art.

FIG. 7 illustrates a seat 100 according to related art. Note that parts of the seat 100 in FIG. 7 that are the same as those of the seat 1 in FIG. 1 are denoted by the same signs, and description will be omitted. In the related art, upper ends 114E of linking members 114 are inserted into holding holes 130 formed in the seat frame 10. The linking members 114 are thus linked to the seat frame 10. Conversely, in the seat 1 according to the present embodiment illustrated in FIG. 1, the portion where the upper ends 14E of the linking members 14 are inserted is changed to the stay 21. That is to say, a mechanism that moves the headrest 22 forward in the front-rear direction of the vehicle can be realized, without requiring additional members, as compared to the related art. The seat 1 according to the present embodiment can suppress increased costs and increased weight.

Although a specific example of the disclosure has been described above in detail, this is only an exemplification, and does not limit the Claims. The technology set forth in the Claims includes various modifications and alterations of the specific example exemplified above. Technical elements described in the present specification or the drawings exhibit technical utility, either singularly or through various types of combinations, and are not limited by combinations set forth in the Claims at the time of application. Also, the technology exemplified in the present specification or the drawings may achieve a plurality of objects simultaneously, and achieving one of these objects in itself has technical utility.

Modifications

The springs biasing the stay 21 are not limited to leaf springs, and various types of springs may be used. Also, the springs are not limited to being integral with the metal bushings 15, and may be in a form of separate springs.

The first region A1 and the second region A2 of each of the linking members 14 are not limited to being an integral part, and may be formed by combining separate parts.

The material of the resin bushings 16 is not limited to resin. Also, the resin bushings 16 may be omitted.

What is claimed is:

1. A vehicle seat comprising:
a seat back frame;
a suspension mat disposed within the seat back frame;
a linking member configured to elastically support the suspension mat at the seat back frame;
a bushing configured to be disposed at an upper portion of the seat back frame;
a hollow stay inserted into the bushing, the stay being configured to protrude upward from the upper portion of the seat back frame; and
a headrest fixed at an upper end of the stay, wherein an upper end of the linking member is inserted into the stay from a lower end of the stay that is inserted into the bushing, wherein
a gap is provided between an inner face of the bushing and an outer face of the stay in a front-rear direction of a vehicle, and
and a spring member that biases the stay toward a rear side in the front-rear direction of the vehicle is provided at an upper-side region of the bushing.

2. The vehicle seat according to claim 1, wherein:
the spring member is a flat spring integrally formed with the bushing; and
the bushing is provided with a slit extending along an outline of the flat spring.

3. The vehicle seat according to claim 1, wherein:
the linking member is provided with
a first region inserted into the stay, and
a second region connecting a lower end of the first region and the suspension mat; and
flexural rigidity of the second region is lower than flexural rigidity of the first region.

4. The vehicle seat according to claim 3, wherein at a time of a rear-end collision, the first region transmits movement of the suspension mat to the stay.

5. A headrest support device for a vehicle seat, the vehicle seat including a suspension mat, a seat back frame, and a headrest, the headrest support device comprising:
a linking member configured to elastically support the suspension mat at the seat back frame;
a bushing configured to be disposed at an upper portion of the seat back frame; and
a hollow stay inserted into the bushing, the stay being configured to protrude upward from the upper portion of the seat back frame, and configured with the headrest fixed at an upper end of the stay, wherein an upper end of the linking member is inserted into the stay from a lower end of the stay that is inserted into the bushing, wherein a gap is provided between an inner face of the bushing and an outer face of the stay in a front-rear direction of a vehicle, and a spring member that biases the stay toward a rear side in the front-rear direction of the vehicle is provided at an upper-side region of the bushing.

6. The headrest support device according to claim 5, wherein:

the spring member is a flat spring integrally formed with the bushing; and the bushing is provided with a slit extending along an outline of the flat spring.

7. The headrest support device according to claim 5, wherein:

the linking member is provided with
 a first region inserted into the stay, and
 a second region configured to connect a lower end of the first region and the suspension mat; and flexural rigidity of the second region is lower than flexural rigidity of the first region.

8. The headrest support device according to claim 7, wherein at a time of a rear-end collision, the first region transmits movement of the suspension mat to the stay.

\* \* \* \* \*